(12) United States Patent
Park et al.

(10) Patent No.: US 10,775,739 B2
(45) Date of Patent: Sep. 15, 2020

(54) COHERENCE ADJUSTABLE DIGITAL HOLOGRAPHY SYSTEM

(71) Applicant: INDUSTRY-ACADEMIC COOPERATION FOUNDATION, YONSEI UNIVERSITY, Seoul (KR)

(72) Inventors: No Cheol Park, Seoul (KR); Jang Hyun Cho, Anyang-si (KR); Sung Bin Jeon, Seoul (KR); Ji Nan Jin, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 304 days.

(21) Appl. No.: 15/633,859

(22) Filed: Jun. 27, 2017

(65) Prior Publication Data
US 2018/0004157 A1    Jan. 4, 2018

(30) Foreign Application Priority Data

Jun. 29, 2016  (KR) .......... 10-2016-0081586

(51) Int. Cl.
*G03H 1/04* (2006.01)
*G03H 1/02* (2006.01)

(52) U.S. Cl.
CPC ......... *G03H 1/0443* (2013.01); *G03H 1/0465* (2013.01); *G03H 2001/0212* (2013.01);
(Continued)

(58) Field of Classification Search
None
See application file for complete search history.

(56) References Cited

U.S. PATENT DOCUMENTS 3,519,323 A * 7/1970 Collier ............... G03H 1/12
359/11
3,867,009 A * 2/1975 Pawluczyk ........ G03H 1/00
359/11
(Continued)

FOREIGN PATENT DOCUMENTS

CN      105116705 A    12/2015
JP      2009-15881 A    1/2009
(Continued)

OTHER PUBLICATIONS

Communication dated Feb. 9, 2018, issued by the Korean Patent Office in counterpart Korean Patent Application No. 10-2016-0081586.

*Primary Examiner* — Derek S. Chapel
(74) *Attorney, Agent, or Firm* — Sughrue Mion, PLLC

(57) ABSTRACT

Disclosed is a coherence-adjustable digital holography system. More particularly, the coherence-adjustable digital holography system includes a light source part for generating low-interference light; a dispersion part for dispersing the generated light, an adjustment part for adjusting coherence by adjusting a spectrum bandwidth of the light which has passed through the dispersion part; and a detection part for detecting a holographic image of a subject from the adjusted light. In accordance with such a configuration, an interference fringe may be easily obtained through coherence adjustment, whereby the accuracy of a detected holographic image may be improved.

10 Claims, 4 Drawing Sheets

(52) U.S. Cl.
CPC ............... *G03H 2001/0415* (2013.01); *G03H 2001/0428* (2013.01); *G03H 2001/0447* (2013.01); *G03H 2001/0452* (2013.01); *G03H 2222/23* (2013.01); *G03H 2222/24* (2013.01); *G03H 2223/14* (2013.01); *G03H 2223/18* (2013.01); *G03H 2227/03* (2013.01)

(56) References Cited

U.S. PATENT DOCUMENTS

| | | | |
|---|---|---|---|
| 7,009,700 B2* | 3/2006 | Dubois | G01N 21/6458 356/317 |
| 2012/0200901 A1 | 8/2012 | Dubois et al. | |
| 2019/0369557 A1* | 12/2019 | Lee | G03H 1/0465 1/465 |

FOREIGN PATENT DOCUMENTS

| | | | |
|---|---|---|---|
| JP | 2009-294512 A | 12/2009 | |
| JP | 2013507647 A | 3/2013 | |
| KR | 10-2012-0071405 A | 7/2012 | |
| KR | 10-1264125 B1 | 5/2013 | |

* cited by examiner (a)

(b)

COHERENCE ADJUSTABLE DIGITAL HOLOGRAPHY SYSTEM

CROSS-REFERENCE TO RELATED APPLICATION

This application claims the priority benefit of Korean Patent Application No. 10-2016-0081586, filed on Jun. 29, 2016 in the Korean Intellectual Property Office, the disclosure of which is incorporated herein by reference.

BACKGROUND OF THE DISCLOSURE

Field of the Disclosure

The present invention relates to a digital holography system, more particularly to a coherence-adjustable digital holography system capable of detecting a high-resolution holographic image by adjusting a spectrum bandwidth of low-interference light.

Description of the Related Art

Digital holography refers to technology for calculating a wavefront of an object by means of a computer to manufacture a digital hologram or reproducing a digital image from hologram information. Three-dimensional imaging by phase measurement is a main application field of digital holography. In particular, transmission-type digital holography, which is characterized by passing object light through a transparent object to obtain a hologram, allows very precise phase obtainment, thereby being utilized for measurement in micro-optical devices, biological samples, and the like.

Micro-optical devices are manufactured by processing a shape on a specific substrate, and biological samples are manufactured by placing a sample on a glass slide. A measured phase is wrapped into and stored as a value between $-\pi$ and $\pi$ due to optical characteristics and then unwrapped into the original phase, followed by obtaining three-dimensional information of an object.

Meanwhile, high-resolution measurement instruments using optical interference utilize a highly coherent light source. Such a highly coherent light source easily obtains interference, but a lot of speckle noise occurs which interferes with accurate measurement. Accordingly, in recent years, various research into application of digital holography to micro-scale measurement while reducing noise has been continuously carried out.

RELATED DOCUMENTS

Patent Documents

Korean Patent Application No. 2012-7012934
Korean Patent Application No. 2011-0140699

SUMMARY OF THE DISCLOSURE

Therefore, the present invention has been made in view of the above problems, and it is one object of the present invention to provide a coherence-adjustable digital holography system configured to increase detection accuracy of a subject by adjusting low-interference light into a desired coherence.

In accordance with an aspect of the present invention, the above and other objects can be accomplished by the provision of a coherence-adjustable digital holography system including a light source part for generating low-interference light; a dispersion part for dispersing the generated light; an adjustment part for adjusting coherence by adjusting a spectrum bandwidth of the light which has passed through the dispersion part; and a detection part for detecting a holographic image of a subject from the adjusted light.

In accordance with an aspect, the light source part may generate low-interference light having multiple wavelengths excluding a laser.

In accordance with an aspect, the light source part may include at least any one of an LED lamp and a halogen lamp.

In accordance with an aspect, the dispersion part may widely disperse a wavelength of light generated from the light source part.

In accordance with an aspect, the dispersion part may include a triangular or annular prism.

In accordance with an aspect, the adjustment part may include at least one slit or iris for adjusting a selection frequency of the light.

In accordance with an aspect, the adjustment part may include a plurality of slits arranged side by side on the path of the light.

In accordance with an aspect, the adjustment part may include a plurality of irises having different opening sizes, wherein at least any one of the irises is arranged on the path of the light.

In accordance with an aspect, the adjustment part may include an iris for adjusting a size of an opening of the adjustment part.

In accordance with an aspect, the detection part may include an image sensor for photographing the light that is reflected by or transmits through the subject.

In accordance with another aspect of the present invention, there is provided a coherence-adjustable digital holography system including a light source part for generating low-interference light; an adjustment part for adjusting coherence by adjusting a spectrum bandwidth of the light after dispersion of the light; and a detection part for detecting a holographic image of a subject from the adjusted light, wherein the adjustment part includes a prism for refracting and dispersing the light; and an adjuster for adjusting the dispersed light to have at least one selection frequency.

In accordance with an aspect, the light source part may include at least any one of an LED lamp and a halogen lamp.

In accordance with an aspect, the prism may include a triangular or annular prism.

In accordance with an aspect, the adjuster may include one or more slits or irises having different opening sizes.

In accordance with an aspect, the adjuster may include a plurality of slits arranged side by side on a path of the light.

In accordance with an aspect, the adjuster may include a plurality of irises having different opening sizes, wherein at least any one of the irises is arranged on a path of the light.

In accordance with an aspect, the adjuster may include an iris for adjusting a size of an opening of the adjuster.

In accordance with an aspect, the detection part may include an image sensor for photographing the light that is reflected by or transmits through the subject.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Hereinafter, a preferred first embodiment of the present invention is described more fully with reference to the accompanying drawings.

Figure 1:
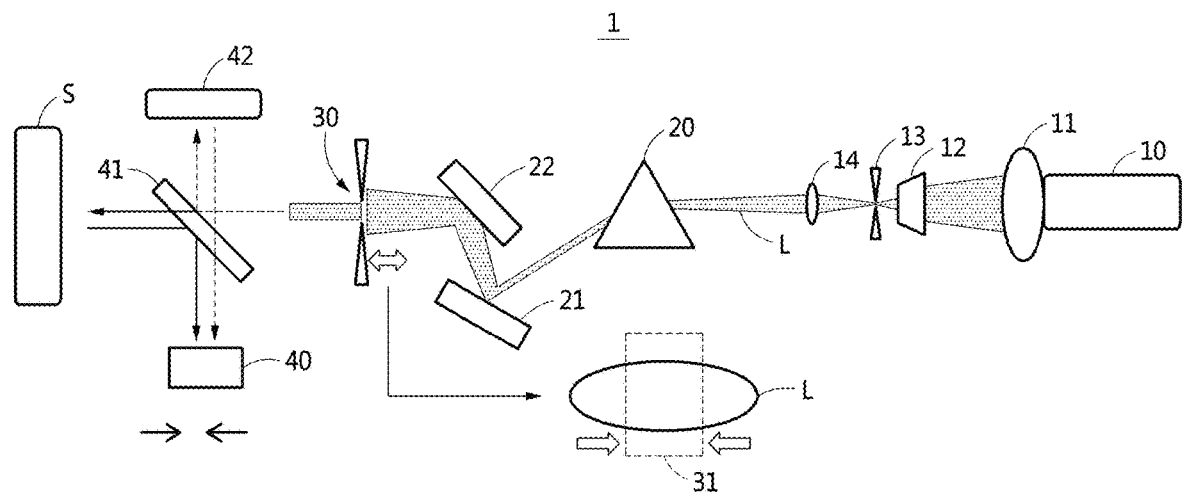
FIG. 1 illustrates a schematic diagram of a coherence-adjustable digital holography system according to a preferred first embodiment of the present invention.
Figure 2:
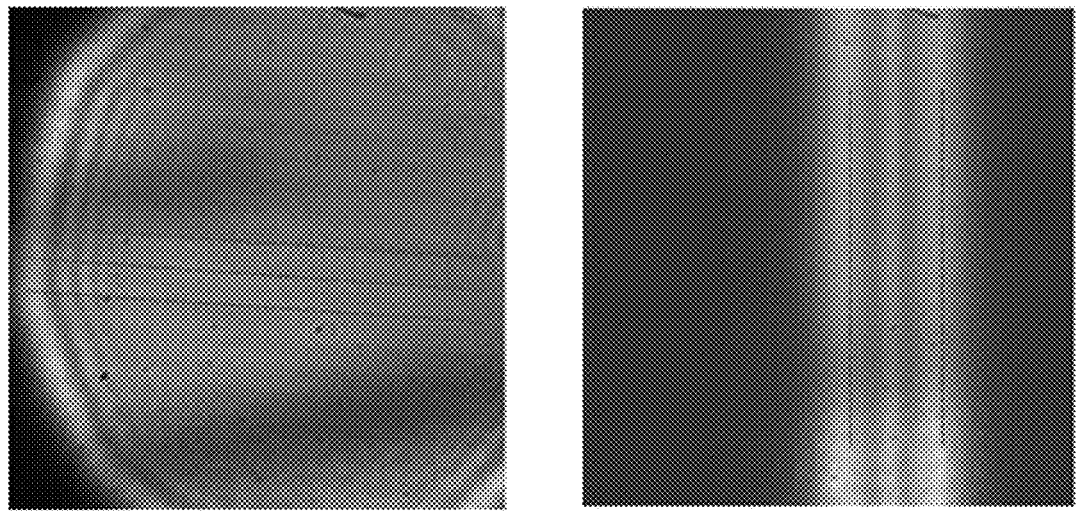
FIG. 2(a) and FIG. 2(b) illustrate images according to a spectrum bandwidth of light adjusted by means of the coherence-adjustable digital holography system shown in FIG. 1.
Figure 2:
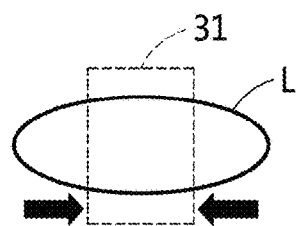
Figure 2:
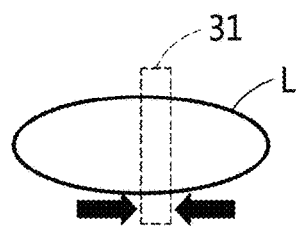

Referring to FIGS. 1, 2(a) and 2(b), a coherence-adjustable digital holography system 1 according to the preferred first embodiment of the present invention includes a light source part 10, a dispersion part 20, an adjustment part 30, and a detection part 40.

The light source part 10 generates low-interference light L. Coherent light refers to two or more lights that have temporally or spatially constant wavelength and phase and thus are able to cause interference. As a representative example of such coherent light, there is a laser. The low-interference light L generated by the light source part 10 may be referred to as a light having a concept opposite to coherent light. In other words, the light source part 10 may be a stable light source having multiple wavelengths excluding a laser.

The light source part 10 includes at least any one of a light emitting diode (LED) lamp and a halogen lamp. In this embodiment, the light source part 10 is exemplified as including an LED lamp. This light source part 10 has a coherence shorter than that of a highly coherent light source such as a laser, thereby generating less speckle noise.

Meanwhile, the light L generated by the light source part 10 is focused by an objective lens 12 via a first guide lens 11 facing the light source part 10 and a wavefront of the light L is uniformly adjusted by a pinhole 13. The light L, which has passed through the pinhole 13, is guided to the dispersion part 20 by the second guide lens 14.

The dispersion part 20 refracts and disperses the generated light L. The dispersion part 20 refers to an optical component configured to widely disperse the wavelength of the light L generated from the light source part 10. The dispersion part 20 may include a triangular or annular prism. In the first embodiment, a triangular prism is included.

The refractive index of the light L, which has passed through the dispersion part 20, depends upon wavelength thereof. Accordingly, the dispersion part 20 spreads the light L while having a diffraction angle dependent upon wavelength, and allows the spread light L to proceed. That is, the light L is dispersed by passing through dispersion part 20 and then proceeds.

The light L, which has been dispersed by passing through the dispersion part 20, sequentially passes through first and second lenses 21 and 22 and is guided to the adjustment part 30. Here, the first and second lenses 21 and 22 spread the light L to a desired wavelength and region while reflecting the light L. A center wavelength and frequency band of the light L are adjusted by passing through the dispersion part 20 and the first and second lenses 21 and 22.

The adjustment part 30 adjusts a spectrum bandwidth of the light L that has passed through the dispersion part 20, and thus, adjusts coherence through adjustment of a selection frequency. The adjustment part 30 includes an adjuster that includes at least any one of a slit and iris for adjusting a selection frequency of the light L.

The adjustment part 30 according to the present embodiment is exemplified as including one slit having an opening, e.g., an adjustment hole 31. A selection frequency of the passing light L is adjusted depending upon the diameter of the adjustment hole 31 of the adjustment part 30. Coherence is adjusted through adjustment of the selection frequency of the light L. For example, when the diameter of the adjustment hole 31 of the adjustment part 30 is decreased, a coherence extends.

For reference, when coherence of the light L is extended by the adjustment part 30, interference fringe obtainment for 3D photographing of a subject S may be advantageous, although paths of the light L are greatly varied. That is, a fringe contrast image may be improved due to extended coherence of the light L, whereby the reliability of measured data may be increased.

The detection part 40 detects a holographic image of the subject S from the adjusted light L. The detection part 40 includes an image sensor (Charge-Coupled Device, CCD) for photographing the light L that is reflected by or transmits through the subject S.

The light L, a selection frequency of which has been adjusted, guided to the detection part 40 is separated by a separation prism 41. A portion of the separated light L is illuminated to and reflected by the subject S to form an object wave, and another portion of the separated light L is illuminated to the detection part 40 to form a reference wave. Here, a position-adjustable reflector 42 is included to guide a path of the light L by blocking leakage of the light L separated by the separation prism 41.

FIGS. 2(a) and 2(b) illustrate images photographed by the detection part 40 using the light L, a spectrum bandwidth of which has been adjusted by the adjustment part 30.

Referring to FIGS. 2(a) and (b), a spectrum bandwidth of the light L is adjusted according to the size of the adjustment hole 31. Accordingly, it can be conformed that different photographed images can be obtained from the same subject S. For reference, FIG. 2(a) illustrates an image when a fringe contrast is low, and FIG. 2(b) illustrates an image when a fringe contrast is high.

Hereinafter, an operation mechanism of the digital holography system 1 having the aforementioned configuration according to the first embodiment for detecting a holographic image of the subject S is described with reference to FIG. 1.

As illustrated in FIG. 1, low coherent light L, which has been generated by the light source part 10 sequentially passes through the first guide lens 11, the objective lens 12, the pinhole 13, and the second guide lens 14, whereby the focus and wavefront of the low coherent light L are adjusted and the low coherent light L is guided to the dispersion part 20. The dispersion part 20 guides the guided light L, in a state in which the guided light L is widely spread, to the adjustment part 30. Here, the light L, which has passed through the dispersion part 20, passes through the first and second lenses 21 and 22 and is guided to the adjustment part 30.

The adjustment part 30 adjusts a spectrum bandwidth of the light L and guides the light L to the detection part 40. Here, the adjustment part 30 lengthily adjusts coherence by adjusting the spectrum bandwidth of the light L. Accordingly, the detection part 40 easily obtains an interference fringe from the light L reflected by the subject S, and thus, may photograph a high-resolution holographic image.

For reference, the generated light L generated by the light source part 10 is exemplified as having a wavelength band of about 620 to 640 nm, and as being adjusted to have a wavelength band of about 632 nm by passing through the dispersion part 20 and the adjustment part 30.

Figure 3:
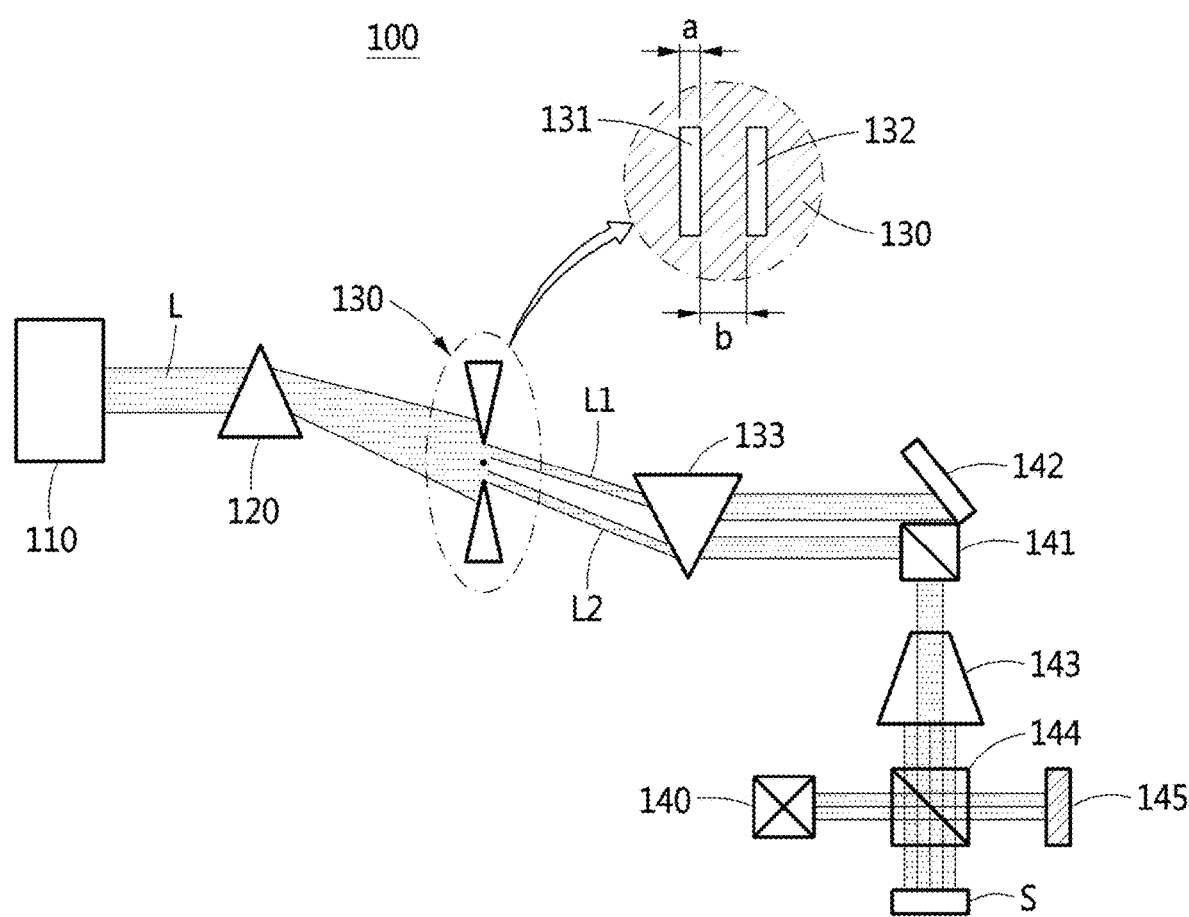
FIG. 3 illustrates a schematic diagram of a coherence-adjustable digital holography system according to a second embodiment of the present invention.

Referring to FIG. 3, a coherence-adjustable digital holography system 100 according to a second embodiment of the present invention is described below.

As illustrated in FIG. 3, the coherence-adjustable digital holography system 100 according to the second embodiment includes a light source part 110, a dispersion part 120, an adjustment part 130, and a detection part 140.

The light source part 110 is exemplified as generating low-interference light, and as including an LED lamp as in the first embodiment. The dispersion part 120 includes a triangular prism for dispersing the light L generated by the light source part 110. The configurations of the light source part 110 and the dispersion part 120 are the same as those of the first embodiment, and thus, detailed description thereof is omitted.

The adjustment part 130 adjusts a center wavelength and frequency band of the light L, which has been dispersed by the dispersion part 120, and thus, adjusts coherence through adjustment of a spectrum bandwidth. The adjustment part 130 according to the second embodiment includes a plurality of slits 131 and 132, and adjusts the light L using a plurality of wavelengths.

More particularly, the adjustment part 130 includes the first and second slits 131 and 132 that are openings having a width, a, and are spaced from each other by an interval, b, as illustrated in a magnified view of FIG. 3. Due to such a configuration of the adjustment part 130, the light L, which has been generated by the light source part 110 and dispersed by the dispersion part 120, passes through the first and second slits 131 and 132 and is adjusted into first and second lights L1 and L2 having two wavelength band.

Meanwhile, the first and second lights L1 and L2, which have been adjusted by passing through the first and second slits 131 and 132, are incident on an adjustment prism 133 and then guided to the detection part 140. Here, the adjustment prism 133 respectively disperses the adjusted first and second lights L1 and L2, and respectively guides the dispersed first and second lights L1 and L2 to an adjustment part 140.

The detection part 140 includes an image sensor for detecting a holographic image from the light L reflected by the subject S using the first and second lights L1 and L2. Hereinafter, an operation mechanism of the detection part 140 for detecting a holographic image of the subject S using the first and second lights L1 and L2, selection frequencies of which have been adjusted, is described in detail.

The first and second lights L1 and L2, which have been adjusted by the adjustment part 130, are guided to a detection prism 141. Portions of the first and second lights L1 and L2, which are not incident on the detection prism 141, are reflected toward the detection prism 141 by a first reflector 142 and thus guided to the detection prism 141. Progress directions of the first and second lights L1 and L2, which have been incident on the detection prism 141, are converted, and the first and second lights L1 and L2 are incident on a detection guide lens 143, followed by being guided to a separation prism 144. By the separation prism 144, the subject S is illuminated by portions of the incident first and second lights L1 and L2 to form a reflected object wave and the detection part 40 is illuminated by other portions thereof to form a reference wave. Here, leakage of the first and second lights L1 and L2, which have been separated by the separation prism 144, is blocked by a second reflector 145.

Figure 4:
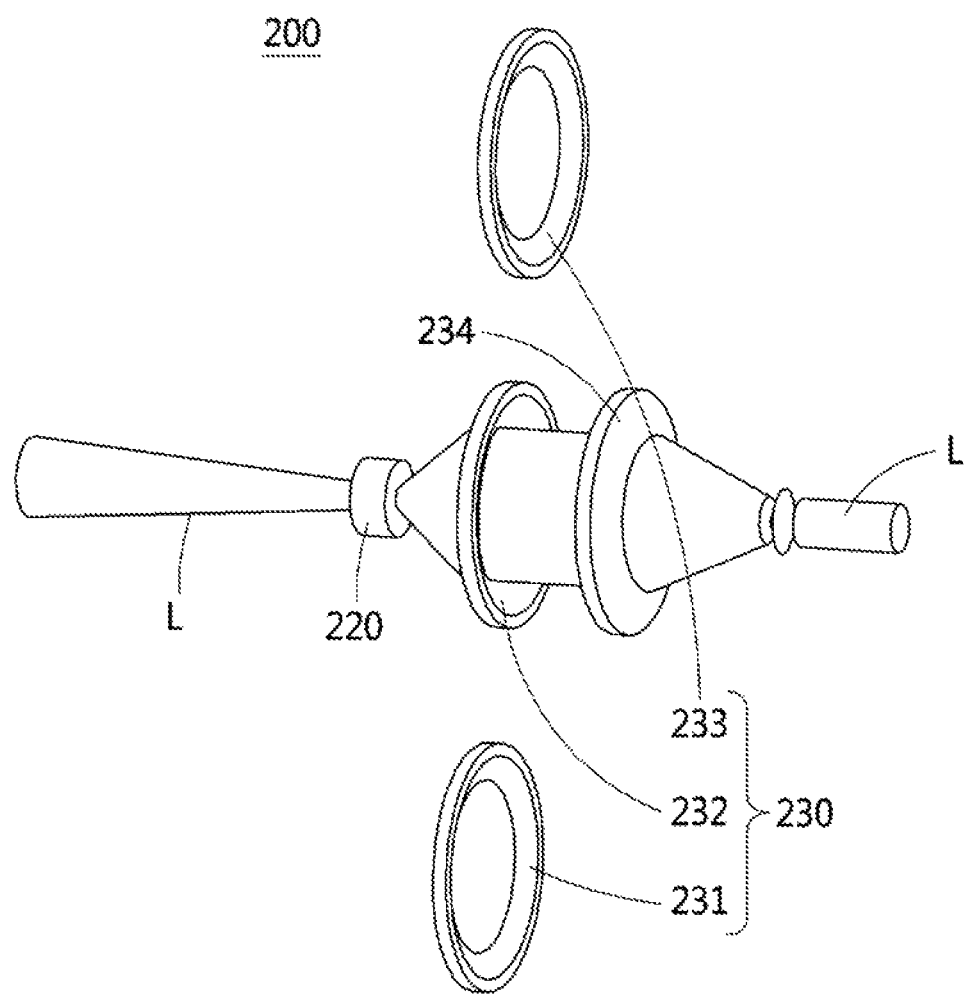
FIG. 4 schematically illustrates a perspective view of a coherence-adjustable digital holography system according to a third embodiment of the present invention.

FIG. 4 schematically illustrates a coherence-adjustable digital holography system 200 according to a third embodiment of the present invention.

As illustrated in FIG. 4, the coherence-adjustable digital holography system 200 according to the third embodiment includes a light source part (not shown), a dispersion part 220, an adjustment part 230, and a detection part. Here, FIG. 4 merely illustrates the configurations of the dispersion part 220 and adjustment part 230, as characteristic configurations of the third embodiment, and description and illustration of the configurations of a light source part (not shown) and a detection part (not shown) are omitted because the configurations of the light source part and the detection part are similar to those of the aforementioned first and second embodiments.

The dispersion part 220 according to the third embodiment includes an annular prism and is configured to disperse the light L. The dispersion part 220 including such an annular prism also widely disperses low-interference light L, which is arranged on the path of the light L, by varying the refractive index of the low-interference light L according to wavelength, similarly to the aforementioned dispersions parts 20 and 120.

The adjustment part 230 according to the third embodiment includes at least one iris, and thus, adjusts a spectrum bandwidth of the light L dispersed by passing through the dispersion part 220. In the third embodiment, the adjustment part 230 is exemplified as including three irises, i.e., one to three irises 231, 232, and 233, which respectively adjust a spectrum bandwidth of the light L and thus adjust coherence.

Here, the first and third irises 231, 232, and 233 respectively have different-size openings, and thus, respectively adjust the light L to have different spectrum bandwidths. For example, the first iris 231 is exemplified as having an opening with a diameter of about 50 mm, and the second and third irises 232 and 233 are exemplified as respectively having an opening with a diameter of 45 mm and an opening with a diameter of 48 mm. Due to such different openings of the first to third irises 231, 232, and 233, any one of the first to third irises 231, 232, and 233 which corresponds to a desired wavelength band is selectively arranged on the path of the light L to adjust the wavelength band. For reference, 234 illustrated in FIG. 4 is an adjustment prism through which the light L passing through the adjustment part 230 passes.

Figure 5:
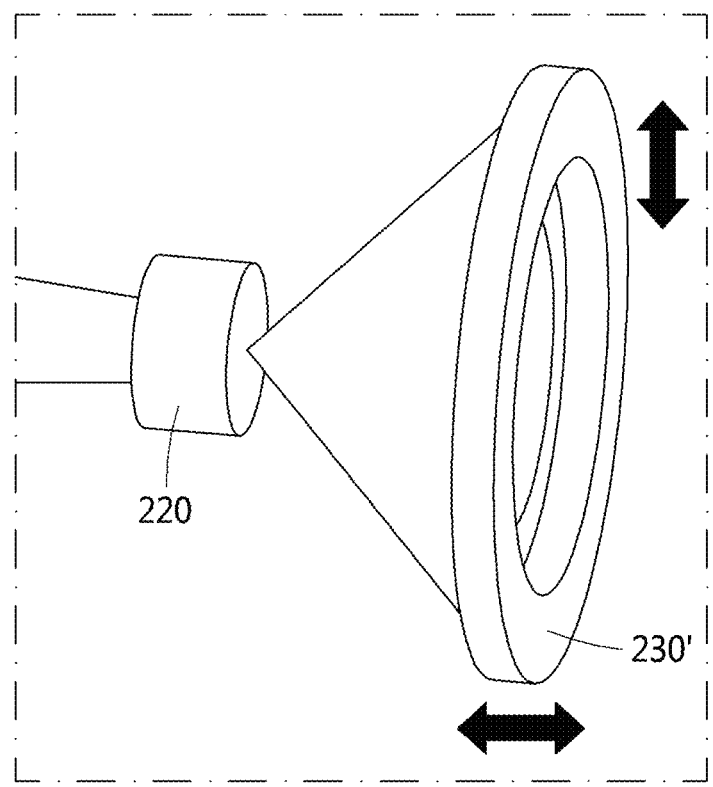
FIG. 5 schematically illustrates a perspective view of a modified example of an adjustment part of the coherence-adjustable digital holography system shown in FIG. 4.

Meanwhile, in FIG. 4, the adjustment part 230 is exemplified as including the first to third irises 231, 232, and 233 having different opening sizes, but the present disclosure is not limited thereto. That is, as illustrated in FIG. 5, an adjustment part 230' for adjusting the spectrum bandwidth of the light L may include a size-adjustable iris without fixation of the size of an opening of adjustment part 230'.

In accordance with the present invention having the aforementioned configuration, first, an interference fringe may be easily obtained by dispersing low-interference light to adjust a spectrum bandwidth and thus adjusting coherence, whereby detection accuracy of holographic image may be improved.

Second, since coherence may be adjusted, images of various subjects including small biological samples having a thin thickness may be detected.

Third, since the quality of a fringe contrast image is improved, the reliability of measured data increases.

Fourth, since spectrum bandwidth adjustment of light, such as band width extension of light, may be easily performed also in the case of a subject having serious inversion noise, it is possible to detect data having high reliability despite the presence of noise.

While the present invention has been described referring to the preferred embodiments, those skilled in the art will appreciate that many modifications and changes can be made to the present invention without departing from the spirit and essential characteristics of the present invention.

DESCRIPTION OF SYMBOLS 1, 100, 200: DIGITAL HOLOGRAPHY SYSTEM
10, 110, 210: LIGHT SOURCE PART
20, 120, 220: DISPERSION PART
30, 130, 230: ADJUSTMENT PART
40, 140: DETECTION PART

What is claimed is:

1. A coherence-adjustable digital holography system, comprising:
    a light source part for generating low-interference light;
    a dispersion part for dispersing the generated light;
    an adjustment part for adjusting coherence by adjusting a spectrum bandwidth of the light which has passed through the dispersion part; and
    a detection part for detecting a holographic image of a subject from the adjusted light,
    wherein the adjustment part comprises a plurality of slits having different opening sizes for adjusting a selection frequency of the light.

2. The coherence-adjustable digital holography system according to claim 1, wherein the light source part generates low-interference light having multiple wavelengths excluding a laser.

3. The coherence-adjustable digital holography system according to claim 1, wherein the light source part comprises at least any one of an LED lamp and a halogen lamp.

4. The coherence-adjustable digital holography system according to claim 1, wherein the dispersion part disperses a wavelength of light generated from the light source part.

5. The coherence-adjustable digital holography system according to claim 1, wherein the dispersion part comprises a triangular prism.

6. The coherence-adjustable digital holography system according to claim 1, wherein the detection part comprises an image sensor for photographing the light that is reflected by or transmits through the subject.

7. A coherence-adjustable digital holography system, comprising:
    a light source part for generating low-interference light;
    an adjustment part for adjusting coherence by adjusting a spectrum bandwidth of the light after dispersion of the light; and
    a detection part for detecting a holographic image of a subject from the adjusted light,
    wherein the adjustment part comprises:
    a prism for refracting and dispersing the light; and
    an adjuster for adjusting the dispersed light to have at least one selection frequency,
    wherein the adjuster comprises a plurality of slits having different opening sizes.

8. The coherence-adjustable digital holography system according to claim 7, wherein the light source part comprises at least any one of an LED lamp and a halogen lamp.

9. The coherence-adjustable digital holography system according to claim 7, wherein the prism comprises a triangular prism.

10. The coherence-adjustable digital holography system according to claim 7, wherein the detection part comprises an image sensor for photographing the light that is reflected by or transmits through the subject.

* * * * *